United States Patent
Marder-Eppstein et al.

(10) Patent No.: US 12,382,886 B2
(45) Date of Patent: Aug. 12, 2025

(54) CONTROL SPACE OPERATING SYSTEM

(71) Applicant: Hippo Harvest Inc., San Francisco, CA (US)

(72) Inventors: Eitan Marder-Eppstein, San Francisco, CA (US); Wim Meeussen, Redwood City, CA (US); Alexander Boenig, San Mateo, CA (US)

(73) Assignee: Hippo Harvest Inc.

( * ) Notice: Subject to any disclaimer, the term of this patent is extended or adjusted under 35 U.S.C. 154(b) by 857 days.

(21) Appl. No.: 17/182,218

(22) Filed: Feb. 22, 2021

(65) Prior Publication Data

US 2021/0259163 A1 Aug. 26, 2021

Related U.S. Application Data

(60) Provisional application No. 62/979,364, filed on Feb. 20, 2020.

(51) Int. Cl.
| | |
|---|---|
| *A01G 31/02* | (2006.01) |
| *A01G 7/02* | (2006.01) |
| *A01G 7/04* | (2006.01) |
| *A01G 9/029* | (2018.01) |
| *A01G 9/24* | (2006.01) |

(Continued)

(52) U.S. Cl.
CPC .............. *A01G 31/02* (2013.01); *A01G 7/02* (2013.01); *A01G 7/045* (2013.01); *A01G 9/0299* (2018.02); *A01G 9/247* (2013.01); *A01G 9/26* (2013.01); *A01G 25/09* (2013.01); *A01G 25/16* (2013.01); *A01G 27/00* (2013.01); *A01G 27/001* (2013.01); *A01G 27/003* (2013.01); *A01G 27/008* (2013.01); *A01M 7/0089* (2013.01); *B25J 11/00* (2013.01); *B60P 3/30* (2013.01); *G05B 19/042* (2013.01); *G06F 16/25* (2019.01); *G06Q 10/06315* (2013.01); *G06Q 50/02* (2013.01);

(Continued)

(58) Field of Classification Search
CPC .......... A01G 31/02; A01G 7/02; A01G 7/045; A01G 9/249; F24F 11/00; G05B 19/042; G06Q 10/06315; G06Q 50/02

See application file for complete search history.

(56) References Cited

U.S. PATENT DOCUMENTS

| | | | |
|---|---|---|---|
| 11,457,578 B2 | 10/2022 | Marder-Eppstein et al. | |
| 11,726,439 B1 * | 8/2023 | Manautou | G06Q 50/02 700/276 |

(Continued)

FOREIGN PATENT DOCUMENTS

| | | |
|---|---|---|
| CA | 3172546 A1 | 8/2021 |
| CN | 108496654 A | 9/2018 |

(Continued)

OTHER PUBLICATIONS

U.S. Appl. No. 17/182,222, Non-Final Office Action mailed May 10, 2021, 8 pgs.

(Continued)

*Primary Examiner* — Manuel L Barbee

(57) ABSTRACT

A control space operating system. The system includes a control space with one or more data source zones and a control space manager. The control space manager can collect data and control different variables across different data source zones in order to determine optimal policies and conditions for data source growth and generation.

10 Claims, 12 Drawing Sheets

(51) Int. Cl.
*A01G 9/26* (2006.01)
*A01G 25/09* (2006.01)
*A01G 25/16* (2006.01)
*A01G 27/00* (2006.01)
*A01M 7/00* (2006.01)
*B25J 11/00* (2006.01)
*B60P 3/30* (2006.01)
*G05B 19/042* (2006.01)
*G06F 16/25* (2019.01)
*G06Q 10/0631* (2023.01)
*G06Q 50/02* (2024.01)

(52) U.S. Cl.
CPC .............. *A01G 9/24* (2013.01); *A01M 7/0025* (2013.01); *G05B 2219/23133* (2013.01)

(56) References Cited

U.S. PATENT DOCUMENTS

| | | | |
|---|---|---|---|
| 2011/0099667 A1* | 4/2011 | Aukerman | C12N 15/8271 536/23.6 |
| 2012/0297675 A1 | 11/2012 | Hashimoto et al. | |
| 2018/0365137 A1 | 12/2018 | Millar | |
| 2018/0368344 A1 | 12/2018 | Marshall | |
| 2019/0045731 A1 | 2/2019 | Dixon et al. | |
| 2019/0075741 A1* | 3/2019 | Olesen | A01G 31/06 |
| 2019/0281778 A1 | 9/2019 | Hawley-Weld et al. | |
| 2020/0356078 A1* | 11/2020 | Edelkhani | A01G 31/00 |
| 2021/0127594 A1 | 5/2021 | Millar | |
| 2021/0137028 A1 | 5/2021 | Zelkind et al. | |
| 2021/0259160 A1 | 8/2021 | Marder-Eppstein et al. | |
| 2023/0028722 A1 | 1/2023 | Marder-Eppstein et al. | |

FOREIGN PATENT DOCUMENTS

| | | | | |
|---|---|---|---|---|
| CN | 110679340 A | | 1/2020 | |
| EP | 3476211 A2 | | 5/2019 | |
| WO | WO-2019074549 A1 | * | 4/2019 | ............ A01G 31/06 |
| WO | 2019222860 A1 | | 11/2019 | |

OTHER PUBLICATIONS

U.S. Appl. No. 17/182,222, Examiner Interview Summary mailed Jun. 24, 2021, 2 pgs.
Int'l Application Serial No. PCT/US21/19130, Int'l Search Report and Written Opinion mailed Jun. 9, 2021.
U.S. Appl. No. 17/938,032, USPTO e-Office Action: CTNF—Non-Final Rejection, Jan. 18, 2023, 4 pages.
U.S. Appl. No. 17/182,222, Advisory Action mailed Oct. 22, 2021, 3 pgs.
U.S. Appl. No. 17/182,222, Examiner Interview Summary mailed Feb. 2, 2022, 2 pgs.
U.S. Appl. No. 17/182,222, Final Office Action mailed, Sep. 14, 2021, 8 pgs.
U.S. Appl. No. 17/182,222, Non-Final Office Action mailed Jan. 5, 2022, 8 pgs.
U.S. Appl. No. 17/182,222, Notice of Allowance mailed Jun. 2, 2022, 5 pgs.

* cited by examiner

CONTROL SPACE OPERATING SYSTEM

CROSS-REFERENCE TO RELATED APPLICATIONS

This application claims priority to Provisional U.S. Patent Application No. 62/979,364, titled "Growspace Operating System," filed on Feb. 20, 2020, by Eitan Marder-Eppstein et al., which is incorporated herein by reference in its entirety and for all purposes.

TECHNICAL FIELD

The present disclosure relates generally to agriculture, and more specifically to growspace farming systems.

DESCRIPTION OF RELATED ART

Agriculture has been a staple for mankind, dating back to as early as 10,000 B.C. Through the centuries, farming has slowly but steadily evolved to become more efficient. Traditionally, farming occurred outdoors in soil. However, such traditional farming required vast amounts of space and results were often heavily dependent upon weather. With the introduction of greenhouses, crops became somewhat shielded from the outside elements, but crops grown in the ground still required a vast amount of space. In addition, ground farming required farmers to traverse the vast amount of space in order to provide care to all the crops. Further, when growing in soil, a farmer needs to be very experienced to know exactly how much water to feed the plant. Too much and the plant will be unable to access oxygen; too little and the plant will lose the ability to transport nutrients, which are typically moved into the roots while in solution.

One disadvantage of traditional farming is the lack of control over the environment and growing conditions. With the advent of growspaces, external environmental factors, such as weather, can be removed. However, current growspaces are still inefficient because of the lack of modular or zonal control within a growspace. Improvements to growth are discovered through trial and error experimentation. In addition, lessons are usually learned in a research and development (R&D) facility independent from production.

Further, operating a growspace today comes with a number of challenges that place significant burdens on farmers and leads to increased costs and/or inefficient food production. For example, current growspace systems have high manual labor costs for maintenance of crops and data gathering. If farmers want to reduce labor costs, they can purchase traditional manufacturing equipment, which is very expensive. Last, current growspace systems do not have the ability to easily evolve because obtaining granular data can be infeasible and taxing on farmers.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

Aspects of the present disclosure relates to a control space operating system and method for growing plants using the control space operating system. The system comprises a control space and a control space manager. The control space includes one or more variable controllers configured for adjusting one or more variables in the control space. The control space also includes one or more sensors for gathering data. Last, the control space further includes one or more data source zones. Each data source zone is configured to house a data source. The control space manager includes a variability generator configured for determining degrees of adjustment to the one or more variables across different data source zones or for each data source zone. The control space manager also includes a policy implementer configured for determining an optimal policy for a specified criteria. Last, the control space manager further includes a data aggregator configured to collect or store data gathered from the one or more sensors.

In some embodiments, the one or more variables includes nutrient mixtures. In some embodiments, each data source zone allows full control over lighting conditions in the data source zone, independent of other data source zones. In some embodiments, each data source zone includes zonal light emitting diodes (LEDs) or zonal shades for adjusting light in each data source zone. In some embodiments, the one or more variables includes humidity. In some embodiments, the data aggregator utilizes a mobile robot to sense data. In some embodiments, the control space includes a designated centralized sensing area to which data sources are transported for sensing data. In some embodiments, the policy implementer utilizes one or more of the following data signals in determining an optimal policy: labor time, utility cost, and sensor data. In some embodiments, data gathered from the control space is transmitted to a cloud manager that aggregates data from multiple control spaces and facilitates generation of aggregated control space policies for use by the control space manager. In some embodiments, each data source zone is configured for zonal carbon dioxide ($CO_2$) emission control.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
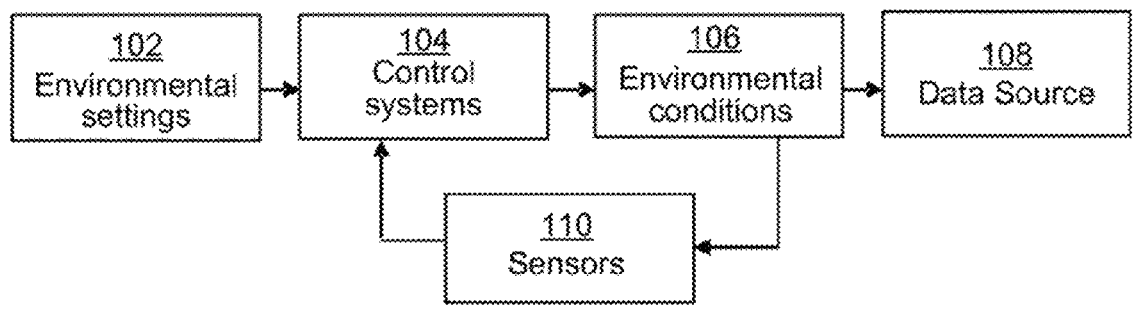
FIG. 1 illustrates a simple diagram showing one example of a typical control space pipeline, in accordance with embodiments of the present disclosure.

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

For example, portions of the techniques of the present disclosure will be described in the context of particular computerized systems. However, it should be noted that the techniques of the present disclosure apply to a wide variety of different computerized systems. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

EXAMPLE EMBODIMENTS

As mentioned above, current growspace systems have many drawbacks. For example, labor costs are high (typically 60-80% of operating expenses) and reliability can be a problem at scale. It can be hard to find/retain good employees, maintain quality, and remain price competitive in an industry that often pays minimum wage or lower (e.g. migrant labor). This is especially true for growspaces that operate in urban areas with higher cost of living and minimum wage.

Another drawback can be capital expenditure. If growspaces want to reduce labor costs, they can look into automation. However, with current technology, automation to reduce labor costs is inflexible and capital intensive. Those growspaces that are automated use traditional process manufacturing techniques, e.g., conveyor belts, cart+rail, or raft systems that are expensive to install, crop specific (e.g. only work with lettuce or tomatoes, not both), and extremely difficult to reconfigure/move once put in place.

Yet another drawback is the lack of data. Getting good, granular data on crop production can be hard. Growspace farmers today struggle to answer questions like "How much labor went into this unit of produce (e.g. head of lettuce, single tomato, etc.)?", "What operations were applied to it and when? (e.g. pest control, pruning, transplanting)", "What is the unit cost of production for the produce we grow?" Traditional methods of tracking labor/materials often rely on immediate data entry that is challenging for farmers that are out in the field, wearing gloves, around lots of water, and unable to regularly interact with electronic devices like phones or computers while working.

Many growspaces are built without data collection in mind requiring retrofits after the fact just to be able to start collection. These retrofits are challenging and expensive as it can be hard to get sensors into a control space that provide sufficient data volume for today's machine learning systems.

The lack of data is often compounded by the slow rate of learning. Experimentation cycles are slow. When farmers want to experiment to improve production in growspaces today they are limited by their fixed infrastructure. Process improvements, tweaks to growing methods, and modifications to growing hardware are often impossible or prohibitively expensive because they imply retooling of the entire growspace. Often, farmers will wait until they build a new growspace to make changes based on learnings from their last operation which leads to improvement cycles that take years. Often times, experimentation and data generation is separate from production. Most of the learning happens in an R&D facility and lessons learned are moved to production through a gradual process of trials. This separation leads to R&D spaces that are much smaller than production spaces and limits the numbers of experiments that can be run. Learning rates with this model are slow. In addition, data gathering in current systems require manual labeling of data. Generating these labels, even in the presence of sufficient data volume is challenging and expensive. Further, current systems struggle to track a data source through its entire lifetime and through automation pipelines. This leads to very coarse metrics (e.g. statistics on the entire production facility, but not on any one data source) that are unsuitable for generating detailed insights.

Last, one other major drawback with current growspace systems is the inability to support diversification. Growspaces that have automation built into them are only capable of growing a small set of crops (often just one) that are aligned with the tooling they have. If a growspace growing lettuce loses a major customer, but finds a replacement that wants tomatoes instead, there is no easy way to switch. The cost of retooling and effort of reconfiguring a growspace prevents growers from making that kind of change. In addition, farmers cannot grow multiple crops or change what they grow based on the time of year or market patterns without changing automation systems (e.g. farmers cannot ramp up tomato production in the winter, but then swap it out for lettuce in the summer as field tomatoes flood the market).

The systems and techniques disclosed herein address the above mentioned issues by providing a control space operating system that utilizes robotic transport, centralized processing, and scheduling/monitoring/tracking software. According to various embodiments, a control space can be a type of grow space, but with much more control over variables.

The systems and techniques disclosed herein provide many advantages over current growspace systems. For example, in some embodiments, the disclosed automation systems are modular, requiring less up-front capital investment and allowing for gradual expansion of a grow operation. In some embodiments, the automation systems disclosed are decoupled from the crops being grown, which means that the techniques and systems work across many different crop types (e.g. lettuce, tomatoes, strawberries, etc.). In some embodiments, the automation systems disclosed are flexible and can be reconfigured on the fly, e.g., using mobile robots instead of conveyors means we can make changes to our farm in software rather than reconfiguring conveyors. In some embodiments, the automation systems disclosed allow for random access to plants. By contrast, conveyor and raft systems only allow farmers to access plants that are at the beginning or end of the conveyor or raft system. In such systems, if anything happens to plants in the middle (e.g., a disease) it's very difficult for growers to take action or even identify that the problem exists using traditional automation processes. In some embodiments, the automation systems disclosed allow for plant level tracking and data collection throughout the growth cycle with scheduling, monitoring, and management software vertically integrated into transport.

Yet another advantage is that, according to some embodiments, the control space is built specifically for data collection, as well as organizing the space, sensors, and controls together to enable large scale experimentation in production environments. Since experiments are no longer restricted to R&D settings only, that data volume scales with the size of production facilities and is not limited to the space dedicated to R&D.

Yet another advantage is that, in some embodiments, the control space is built specifically to ensure sufficient coverage of the variable space to provide neural networks with the variability/richness they need to learn how changes to environmental or other parameters impact a data source. Each data source zone is ensured of running a slightly different policy from any other at all times.

Yet another advantage is that, in some embodiments, the control space is built with automated labeling and tracking in mind. Sensors for and the structure of each data zone are designed to make the task of tracking output metrics (e.g. growth, volume, yield) a natural byproduct of daily operation which greatly reduces or eliminates the need for manually labeled data.

According to various embodiments, the control space operating systems comprises a number of distinct components/modules/subsystems that operate together. However, it should be noted that techniques of the present disclosure do not require all components/modules/subsystems described. For example, in some embodiments, a control space according to the present disclosure can include a single subsystem or any combination of the different subsystems described herein. The different components/modules/subsystems are described in detail below.

Increasingly, data and automation are becoming important components for controlled environment agriculture (CEA) grow spaces, biotech facilities, warehouses, data centers, test spaces for experiments, and other control spaces. However, current control space architectures and their associated control systems make it difficult to introduce variability in environmental conditions that lead to a sufficiently rich understanding of how such conditions impact production conditions. This limitation leads to data pipelines that lack information richness and that are challenging to use with modern machine learning tools which require large amounts of labeled, rich, data to function. Furthermore, control space automation and control systems are frequently designed and employed independently from control space sensing which hampers the efficiency of collection.

FIG. 1 illustrates a simple diagram showing one example of a typical control space pipeline. In FIG. 1, desired environmental settings 102 are passed to control systems 104 which use sensors 110 to attempt to achieve a set of observed environmental conditions 106 for data sources 108. The goal of such control pipelines is to ensure that every data source 108 in the control space experiences environmental conditions 106 that are as uniform and have as little variability as possible. While this achieves consistent production, it makes it hard to determine whether the environmental settings in use are optimal. Any experiments with environmental settings 102 become high risk as they impact production of the entire control space. In addition, cycle times are long, as only one experiment can be run at a time. To combat this, control space operators of today often build separate facilities for experimentation or look to findings from scientific/research institutions. However, the scale of these operations leads to insufficient data volume and the pace of innovation is slow. Allowing for more variability in control space operation at scale to provide modern machine learning tools with the data volume and richness they require can greatly increase the speed of innovation in the CEA, biotech, warehousing, data center, and other related spaces which employ environmental controls and sensors.

Figure 2:
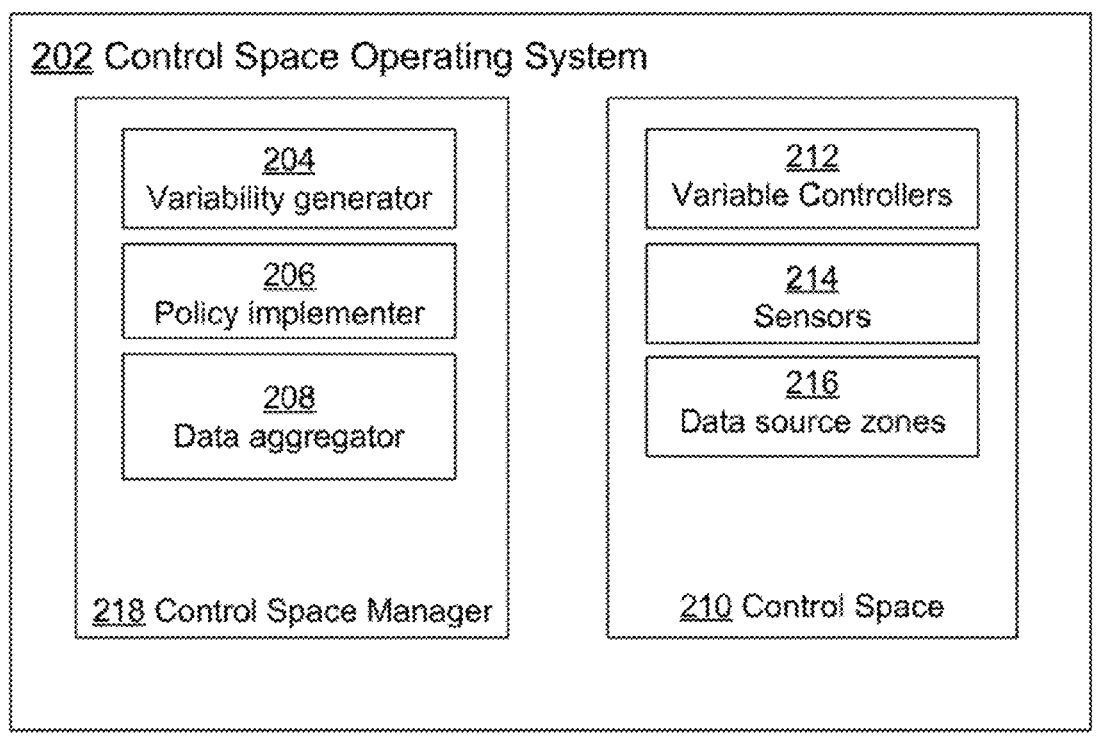
FIG. 2 illustrates a block diagram showing one example of a control space operating system, in accordance with embodiments of the present disclosure.

FIG. 2 presents a control space operating system 202, where the core components of a control space are designed to work together to allow for flexible and effective data collection, aggregation, and processing and to capture variable, rich, and voluminous data. In system 202, a data source 216 is produced in a control space 210 outfitted with variable controllers 212 that allow influence over the environment, and sensors 214 capable of measuring current environmental conditions, as well as the status of data source 216. Control space 210 is paired with a control space manager 218, which is the mechanism by which sufficient data volume, data richness, and policy control are achieved to support advanced machine learning techniques including the training and use of neural networks in control space operations. One example of a control space is a growspace for CEA. In other examples, the control space is a test space or experimental space used to run tests or experiments. In yet other examples, the control space is a data center, biotech production facility or warehouse.

According to various embodiments, in order to ensure data richness and volume, control space manager 218 employs a variability generator 204 that works in conjunction with variable controllers 212 that are specifically designed to have the ability to introduce variability in environmental conditions that data source zones 216 experience across the control space 210. In some embodiments, each data source zone 216 is configured to hold one or more data sources. In some embodiments, this data source is plants. In some embodiments, data sources are bacterial or other biological material. In some embodiments, data sources are servers. In some embodiments, data sources are any type of experimental subjects. In some embodiments, data sources are hardware that must operate under different conditions.

In some embodiments, variability generator 204 modifies variable controller 212 settings to run many parallel experiments across control space 210 to determine how data source production is impacted by environmental parameters. In some embodiments, these parameters include temperature, light, humidity, nutrients, oxygen, carbon dioxide, genetics, etc. In some embodiments, each experiment is tracked by sensors 214 in control space 210 and evaluated by data aggregator 208, which uses machine learning to build a detailed understanding of data source production based on the factors listed above.

According to various embodiments, insights from data aggregator 208 give policy implementer 206 information that can be used to implement or generate new policies. These new policies determine variable settings for data source zones 216 that optimize for volume, production cost, variability, or other desired outcomes for production in control space 210. In some embodiments, these settings determine starting points for control space 210 configuration, variable controllers 212, and data source configurations that are passed to variability generator 204 to refine its exploration of the parameter space on promising areas.

According to various embodiments, the work of control space manager 218 components creates a strong feedback loop wherein large amounts of distinct data points or experiments on data source production are generated in parallel. In some embodiments, this data is used to build a detailed understanding of how data source production is impacted by variable settings. In some embodiments, that understanding is used to predict promising policy settings for variables according to a desired optimization criteria. In addition, these predictions are used and perturbed to generate more data focused on an encouraging area of the variable search space. In some embodiments, this feedback loop is the mechanism by which improvements to control space performance can be greatly accelerated compared to approaches employed today.

Figure 3:
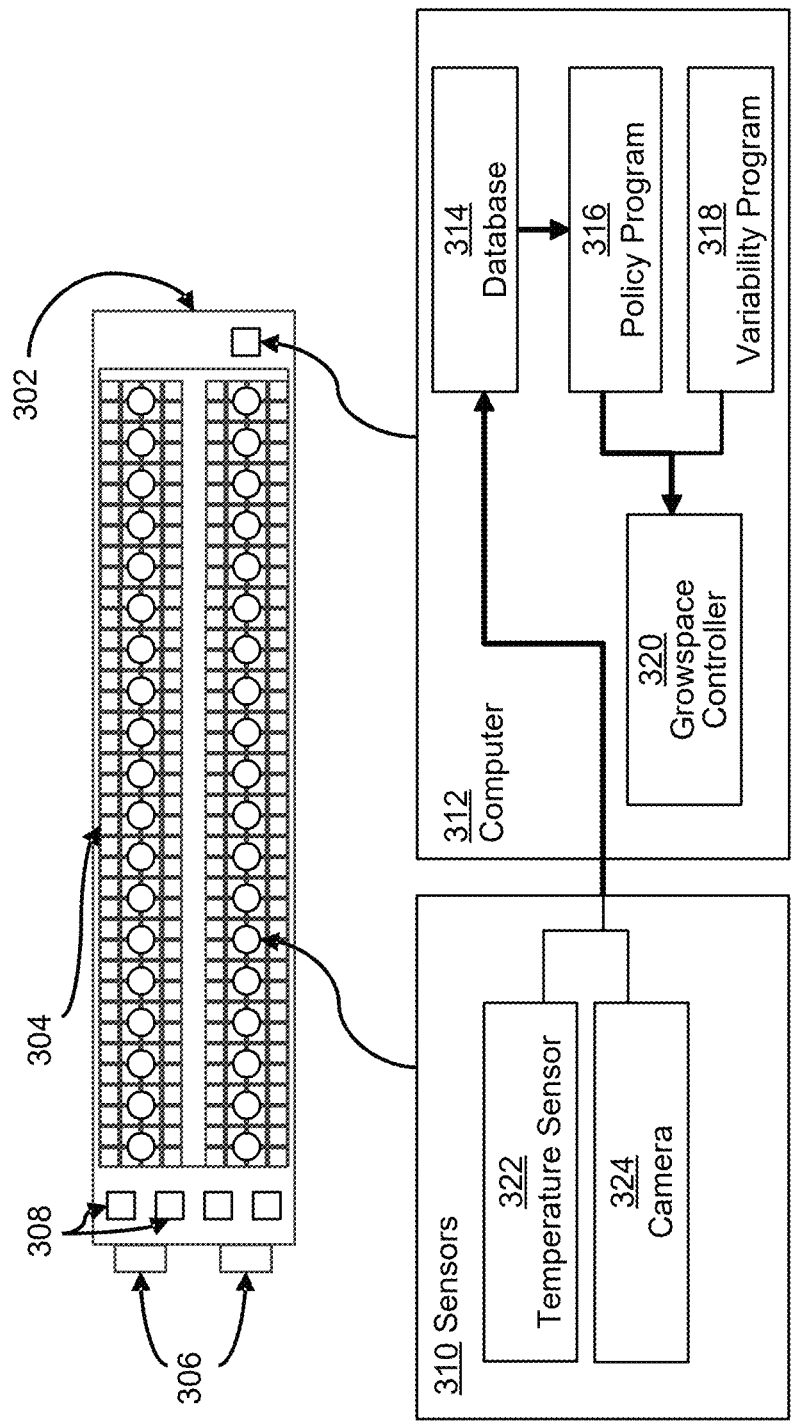
FIG. 3 illustrates an example control space implemented as a growspace, in accordance with embodiments of the present disclosure.

A specific implementation of the general system described above, is shown in FIG. 3. FIG. 3 illustrates an example control space implemented as a growspace 302. In other words, the control space is embodied by a growspace for plant production in controlled environment agriculture (CEA). In FIG. 3, a growspace 302 is equipped with fans 306 and heaters 308 that can be used to modify the temperature in which plants 304 are grown.

According to various embodiments, when cooling is desired, fans 306 move cool air from outside growspace 302 through the structure creating a temperature gradient where air is cooler closer to the fan side of growspace 302 compared to the opposite side of growspace 302. The slope of this gradient (e.g. the difference between the temperature close to and opposite the fans) is determined by the speed at which fans 306 move air through growspace 302. When fans 306 move air slowly, there is more opportunity for radiant energy (e.g. from the sun) to heat air as it moves through growspace 302, leading to a larger temperature gradient across growspace 302. When the fans move air quickly, there is less opportunity for air to heat up leading to a smaller temperature gradient across growspace 302. As such, variability generator 204 can introduce more or less variability in temperature by changing the speed of fans 306.

According to various embodiments, when heating is desired, heaters 308 move hot air created by burning natural gas, propane, or other means through growspace 302. The temperature gradient of air across growspace 302 is, once again, impacted by the speed at which heaters 308 output air. If the heaters output air slowly, there is more time for air to lose heat as it moves from the heater side of growspace 302 to the opposite side, leading to a larger temperature gradient. If the heaters output air quickly, there is less time for air to lose heat as it moves from one side of growspace 302 to the other leading to a smaller temperature gradient.

According to various embodiments, sensors 310 placed amongst the plants 304 are spread throughout the growspace and monitor observed conditions for an area of growspace 302, while logging their readings to a computer or group of computers 312, which may be located on site or remotely. In some embodiments, these sensor readings are then sent to database 314 where they are stored for later processing. In some embodiments, temperature sensors 322 are used to record the temperature that plants 304 experience in their region of growspace 302, while cameras 324 are used to collect imagery of plant growth over time.

According to various embodiments, once data on a full growth cycle, from seeding to harvest, is collected for a plant 304, policy program 316 pulls associated data from database 314 for processing. Policy program 316 computes growth curves for plants from imagery taken by camera 324 and associates this with data from temperature sensor 322. Policy program 316 repeats this process for growth cycles of all plants 304 that have been grown to the current point and compares results, optionally with human input, to determine temperature settings for growspace 302 that are likely to optimize plant growth.

According to various embodiments, these temperature settings are output from policy program 316 and passed to growspace controller 320 which is responsible for controlling fans 306 and heaters 308 within growspace 302 to achieve desired environmental conditions. In addition to these settings, growspace controller 320 also takes input from a variability program 318 that outputs a desired variability in temperature range for growspace 302 (e.g., it requests a 10 degree difference from one side of the growspace to another). In some embodiments, separating policy generation and implementation and desired experimental variability into two separate components is the mechanism by which learning rates in a growspace are greatly accelerated compared to current approaches. Specifically, this decoupling explicitly pursues the variability required for neural networks to effectively explore the impact of environment on plant performance. Traditional growspaces may concern themselves with policy implementation, but not in ensuring the data they generate in production is compatible and effective with modern machine learning techniques. As such, they often lack sufficient data richness and variability for these techniques to be effective.

According to various embodiments, growspace controller 320 combines the temperature settings specified by policy program 316 with the desired variability expressed by variability program 318 to determine the speed at which to run fans 306 for cooling or heaters 308 for heating. As described above, the air speed of fans 306 or heaters 308 will determine the range of temperatures that plants 304 experience in a growspace 302 centered around the base temperature settings requested by policy program 316.

According to various embodiments, as the number of growth cycles for plants 304 increases, the system allows policy program 316 to receive data from sensors 310 that contains enough variability (as tuned with variability program 318) to continuously improve an understanding of plant growth as it relates to temperature. This represents a large increase in data richness as compared to industry operations today, and leads to more rapid learning, insights, and tuning of a growspace 302.

According to various embodiments, in addition to temperature, humidity plays an important role in plant growth. The example system presented in FIG. 3 does not provide a mechanism to control humidity within a growspace and typical growspace humidity controls suffer from the same problems of traditional temperature controls in that they do not optimize for variability and data richness. Thus, it may be desirable to expand the system presented in FIG. 3 such that it is also capable of providing humidity control that can be varied over the growspace to facilitate experimentation and learning via data pipelines.

Figure 4:
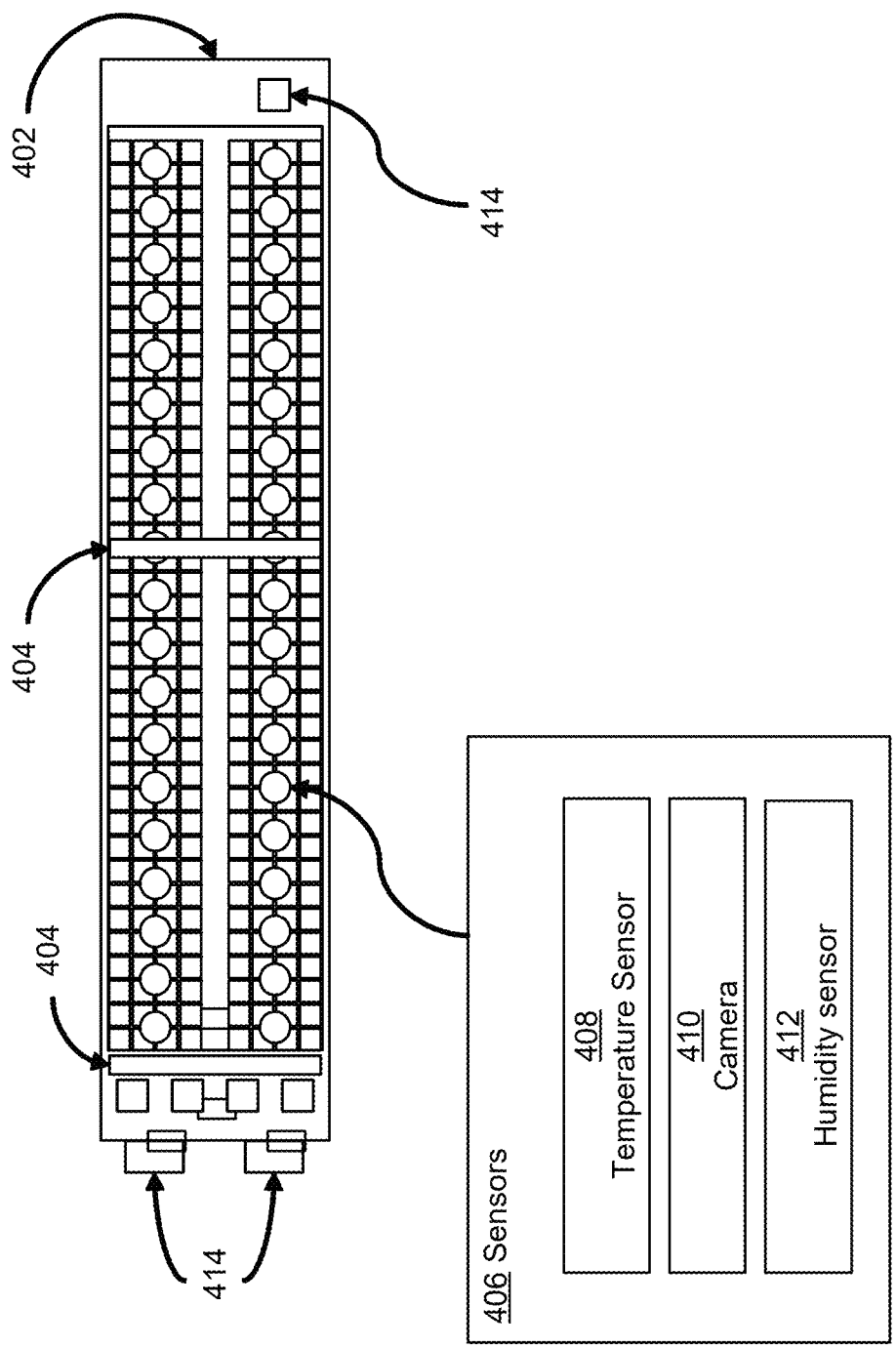
FIG. 4 illustrates an example of a control space with variable humidity control, in accordance with embodiments of the present disclosure.

FIG. 4 presents a system configuration that adds evaporative foggers 404 to growspace 402 which add humidity to the air. In some embodiments, the mechanism used to achieve this in FIG. 4 is to spray water at high pressures into the air with evaporative foggers 404 creating a fine mist that quickly evaporates in the presence of heat. The phase transition from water into water vapor is an endothermic process that increases the humidity of the air while also cooling it. In some embodiments, to control variability of humidity across growspace 402, the fans' speeds can be used once again to determine how quickly water vapor moves from one side of the growspace to the other. A higher fan speed will decrease the differences in humidity from one side of the growspace to the opposite. A lower fan speed will lead to an increased gradient and associated difference.

According to various embodiments, in addition to evaporative foggers 404, the system configuration presented here also adds a humidity sensor 412 in addition to temperature sensor 408 and camera 410. In some embodiments, humidity sensors 412 spread throughout growspace 402 take localized readings of humidity that are used to report observed conditions to computer 414. This additional data can then be taken into account by policy program 316 and variability program 318 as they determine desired environmental settings and build a detailed understanding of how humidity and temperature impact plant growth. In some embodiments, growspace controller 320 is also updated to allow control of evaporative foggers 404 in conjunction with fans 414 so that it can achieve desired settings for humidity and temperature across growspace 402 in accordance with the request of the variability and policy programs.

According to various embodiments, light is another important parameter that impacts plant growth within a growspace. In some growspace configurations, e.g., greenhouses, light enters the growspace naturally in the form of sunlight. While this provides a natural energy source for plant growth which can be economically beneficial, it can also be something that is necessary to reduce. For example, there are situations where plants receive too much light. In some embodiments, the system can control the reduction of light within a growspace in a fashion that also allows variability and richness of data across the growspace.

Figure 5:
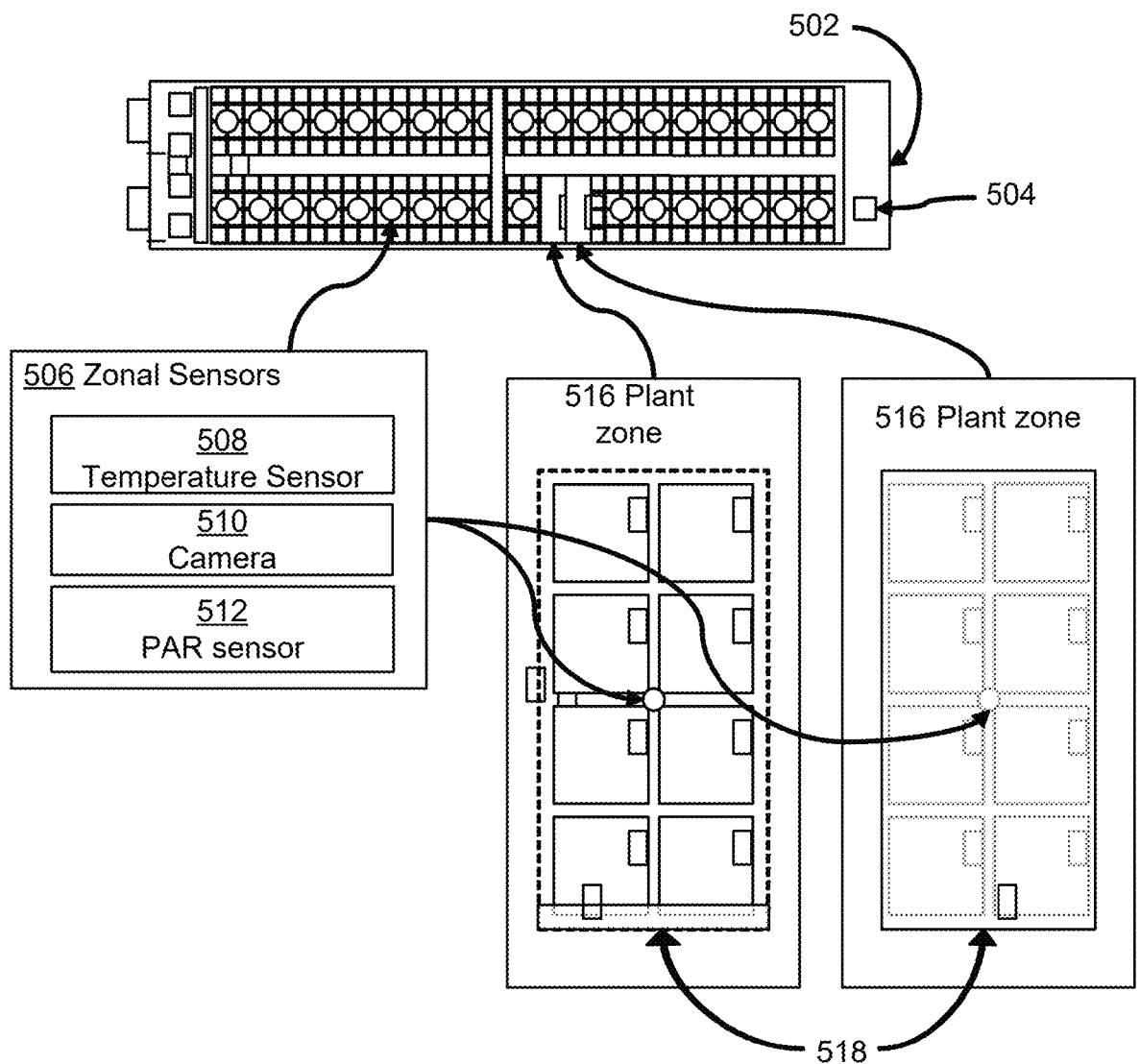
FIG. 5 illustrates an example of a control space with light blocking, in accordance with embodiments of the present disclosure.

FIG. 5 presents an embodiment of the system that allows for light to be blocked within growspace 502 in a way that supports variation from location to location and which can be used to further data richness. To achieve this, growspace 502 is separated into distinct plant zones 516 which contain groups for plants that will experience similar environmental conditions. The greater the number of plant zones 516 in a growspace, the more variability that can be achieved in the footprint. Each plant zone 516 has its own zonal sensors 506 to measure observed conditions. Specifically, each zone has a temperature sensor 508, camera 510, and a photosynthetically active radiation (PAR) sensor 512. PAR sensor 512 measures photosynthetic light levels in the air and is used to understand how much light plants in a plant zone 516 have received over time.

According to various embodiments, when it is desirable to remove light from a plant zone 516 in accordance with a control policy produced by the components running on computer 504 as described in previous embodiments, zonal shades 518 installed in each plant zone 516 can be automatically extended or retracted. Zonal shades 518 block a percentage of light that enters plant zone 516 by blocking it with shade cloth thereby decreasing the amount of light received by plants in the plant zone. As each zonal shade 518 is controlled separately from others in growspace 502, they provide a mechanism by which light levels can be changed in one plant zone 516 independent from any other. This, in turn, provides a mechanism for variability program 318, described in FIG. 3 above, to ensure sufficient data richness from light removal across growspace 502 when the sun provides light input to growspace 502.

According to various embodiments, data from the PAR 512 sensor is fed to computer 504 in addition to the other zonal sensors 506 to which allows policy program 316 to build a model of how temperature and light impact plant growth, which can be used to further improve growspace performance.

According to various embodiments, in certain growspaces where the sun is not present or the amount of sunlight in a day is not sufficient for growth, it is desirable to be able to add light into the growspace.

Figure 6:
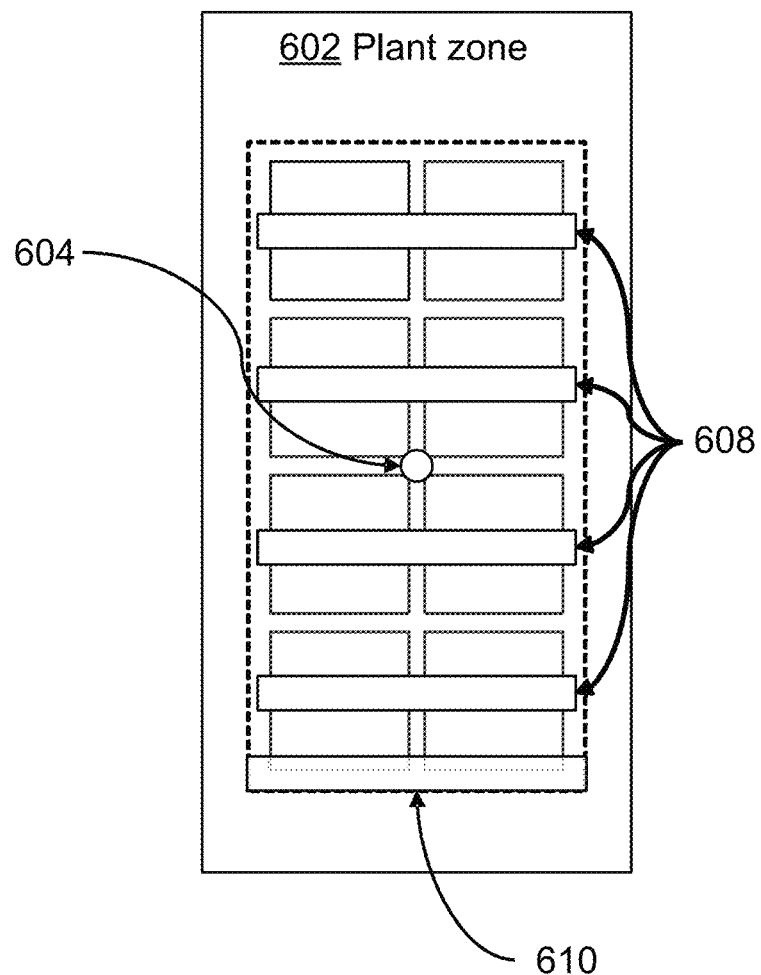
FIG. 6 illustrates an example of a control space with light addition, in accordance with embodiments of the present disclosure.

FIG. 6 presents an embodiment of the system that adds zonal LEDs 608 to each plant zone 602 as a mechanism to add light to a growspace. Each zonal LED 608 can be controlled separately from zonal LEDs 608 in other plant zones 602 which allows for variability and data richness across the growspace. PAR sensor 512 described in FIG. 5 above is also sufficient to monitor and manage control of zonal LEDs 608 and the combination of zonal shades 610 with zonal LEDs 608 allows for full control over the lighting conditions within a growspace. When less light is desired, zonal shades 610 can be extended. When more light is desired, zonal LEDs 608 can be turned on.

Carbon dioxide (CO2) is a necessary component for plant growth. There is a naturally occurring amount of CO2 in the atmosphere that is available for plants to take up, but that may not be sufficient to sustain optimal growth. Thus, it may be desirable to develop mechanisms for actively increasing CO2 concentrations in a growspace to achieve optimal performance.

Figure 7:
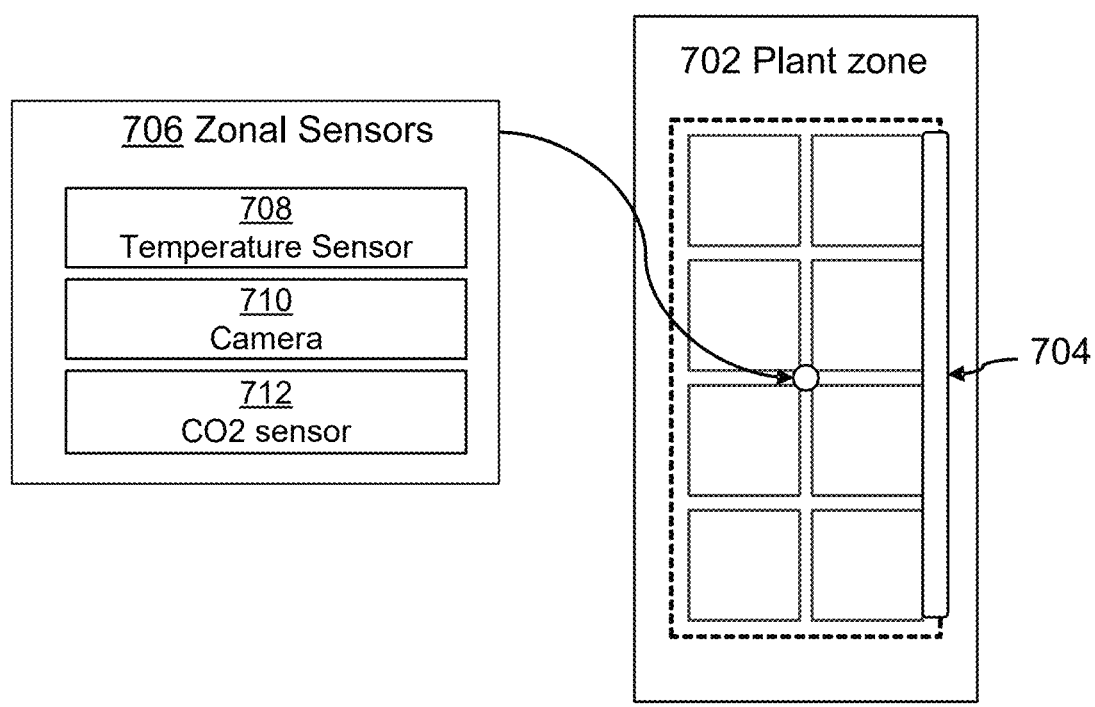
FIG. 7 illustrates an example of a control space with carbon dioxide addition, in accordance with embodiments of the present disclosure.

FIG. 7 presents an embodiment of the system that adds zonal CO2 emitters 704 to each plant zone 702. These zonal CO2 emitters distribute carbon dioxide that is stored in compressed form or collected as a bi-product of heating the growspace and release it into the air via nozzles. Each zonal CO2 emitter 704 is controlled independent from any other in the growspace, which allows for CO2 to be distributed in a targeted fashion per plant zone 702. To ensure sufficient variability and localized control over CO2 levels, growspace controller 320 coordinates the use of growspace fans with zonal CO2 emitters. Specifically, zonal CO2 emitters are used only when the fans are off to guarantee that CO2 distributed to a given plant zone 702 can be absorbed by its associated plants. To measure the amount of CO2 present in a plant zone 702, a CO2 sensor 712 is added to a temperature sensor 708 and camera 710, which make up the zonal sensors 706 for that plant zone 702. This provides yet another input for computer 504 to use as it builds a detailed understanding of environmental factors and their impact on plant growth.

Nutrition is another important component of plant growth. In current growspace systems, however, it is not possible to vary nutrient mixes given to plants across the growspace as standard hydroponic plumbing systems only allow recirculation of one nutrient mixture at a time across a growspace. To better understand and optimize the impact of nutrition on plant growth, it may be necessary to increase the number of different nutrient mixes that can be deployed to plants throughout the growspace at a given time.

Figure 8:
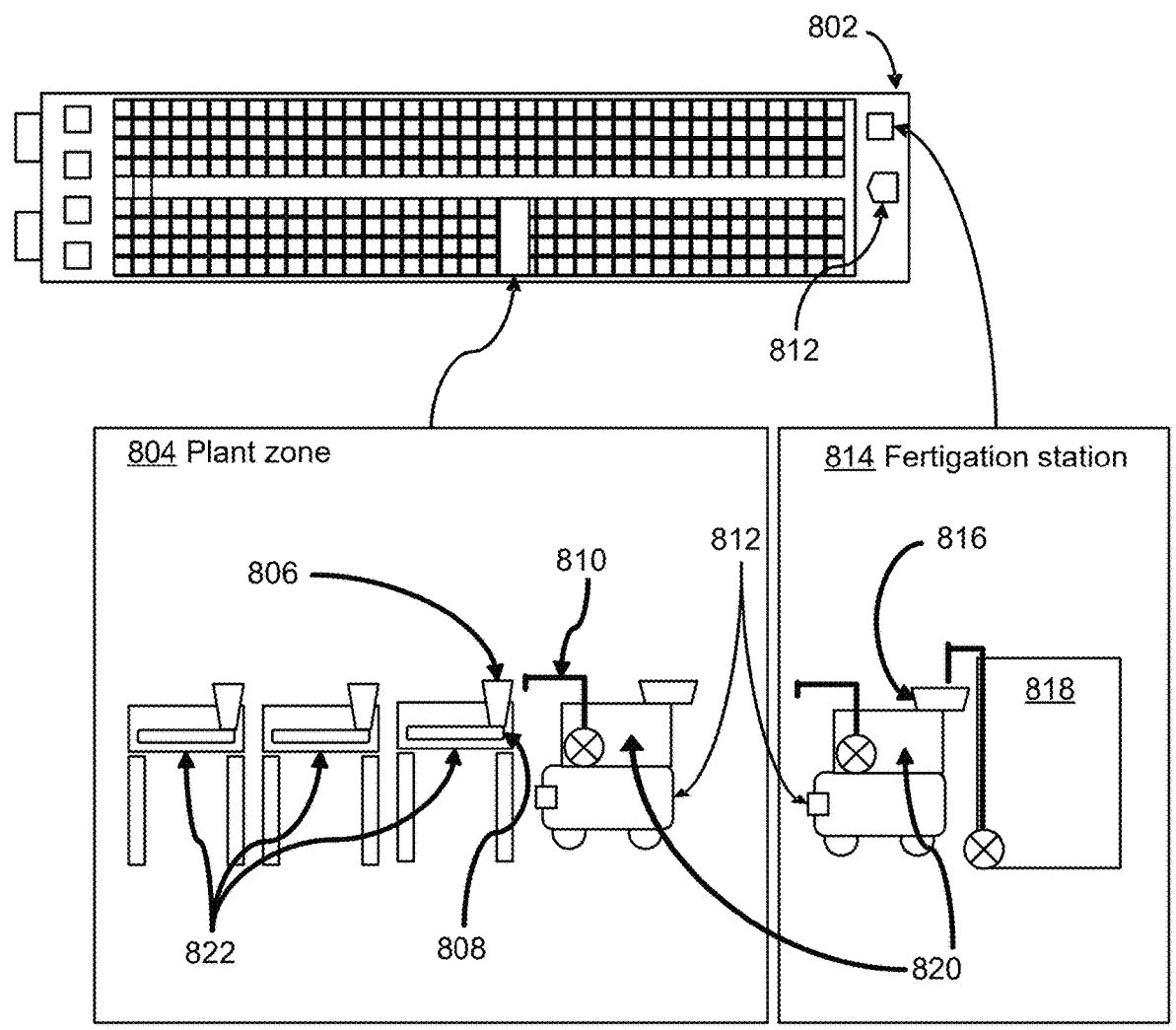
FIG. 8 illustrates an example of a control space with nutrient control, in accordance with embodiments of the present disclosure.

FIG. 8 presents an embodiment of the system that allows for nutrients to be sent to a given plant zone via a robotic plumbing system. Specifically, a robot 812 is responsible for moving nutrient water created by a fertigation system 818 within a growspace 802. Robot 812, goes to a fertigation station 814 located in growspace 802 where fertigation system 818 pumps nutrient water of a given composition (either pre-mixed or created on demand) into robot inflow 816 which flows into robot reservoir 820. With nutrient water now stored for transport, robot 812 navigates to a given plant zone 804 within growspace 802. Each plant zone 804 contains one or more growing trays 822 in which plants sit. Each growing tray 822 has a growing tray reservoir 808 which provides nutrient water to the plants in that growing tray 822. When robot 812 arrives at a given growing tray 822 in a given plant zone 804, it pumps water out from robot reservoir 820 through robot outflow 810 into growing tray inflow 806 which feeds growing tray reservoir 808 for a single growing tray 822.

According to various embodiments, the ability to move a unique mix of nutrient water from a fertigation system 818 to any growing tray 822 in a plant zone 804 allows nutrients to be tailored to a specific plant zone 804 or even a single growing tray 822 within growspace 802. This greatly increases the level of control and amount of experimentation that can be performed relative to standard hydroponic systems which can only deliver a single nutrient mix per run of plumbing. Achieving such control with traditional plumbing systems is impractical and costly as it requires separate plumbing runs per growing tray 822 coupled with complex control valves to change the flow of water throughout growspace 802. Using robot 812 for nutrient water transport removes the need for plumbing from growspace 802 altogether while providing a high level of control over what plants receive what nutrients. This allows variability program 318 and policy program 316 on computer 312 to experiment with unique nutrient mixes per growing tray 822 that also change over time (e.g. a different nutrient mix could be delivered on day 10 of growth as compared to day 11).

The embodiments presented above rely on distributed sensors placed throughout a growspace to record data on environmental conditions as well as plant growth. However, the camera sensors (2D, 3D, multi-spectral, etc.) used to measure plant growth are often expensive and it may be prohibitive to deploy them throughout an entire growspace on cost alone. Furthermore, deploying such sensors through a growspace requires other infrastructure like reliable network connectivity and leads to many different potential points of failure which must be carefully monitored. Therefore, it is desirable to reduce the number of sensors that must be deployed to track plant growth and to perform sensing in a central location.

Figure 9:
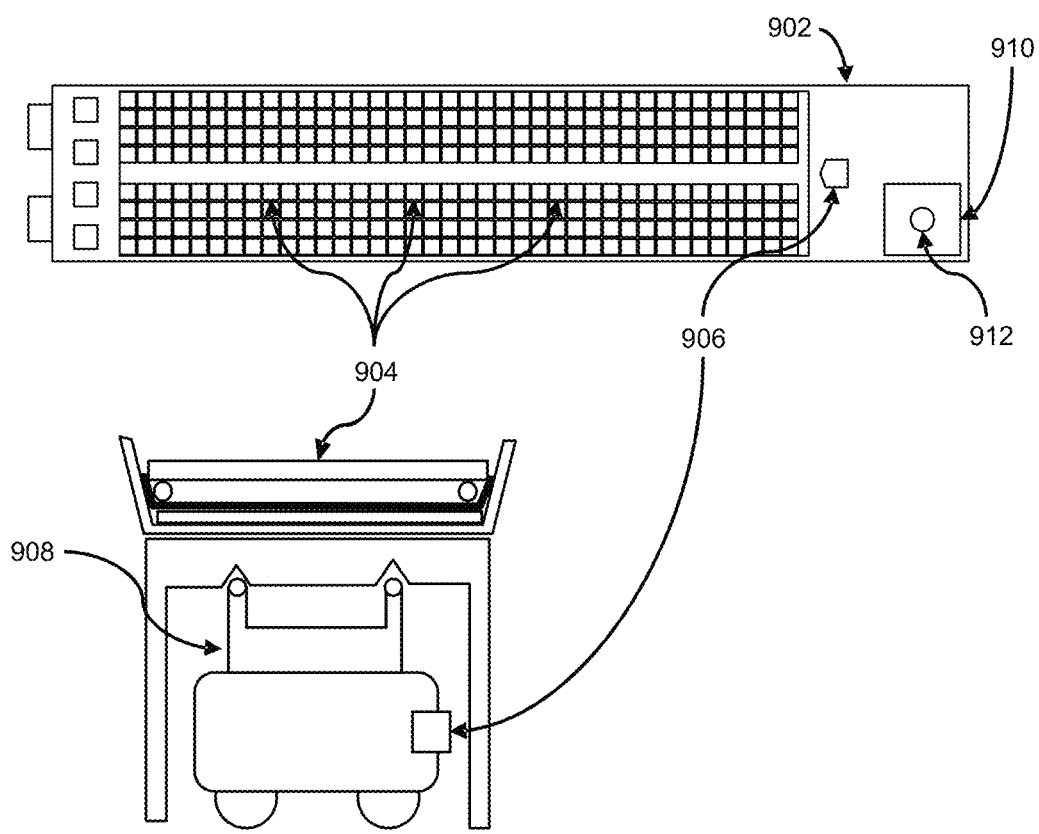
FIG. 9 illustrates an example of a control space with centralized sensing, in accordance with embodiments of the present disclosure.

The example system configuration presented in FIG. 9 facilitates central sensing by transporting growing trays 904 with plants to a central sensing area 910 with a robot 906. To achieve this, robots 906 are outfitted with robot lifts 908 that can pick up growing trays 904 for transport within a growspace 902. When data on plant growth is desired, robot 906 moves a selected growing tray 904 to sensing area 910 where sensors 912 (e.g. 2D cameras, 3D cameras, LiDAR, etc.) take measurements of the plants within a growing tray 904. As all sensing on plant growth happens in sensing area 910, as opposed to performing sensing out in growspace 902, the number of expensive sensors required is drastically reduced. Furthermore, sensing area 910 can be configured to provide the optimal environment for taking sensor readings of plants (e.g. with custom lighting) to ensure uniformity of sensor readings over time.

According to various embodiments, sensing requires either distributed sensors placed throughout the growspace or robot transport of plants in growing trays to a central sensing area. For systems that require distributed sensing, cost and complexity of the sensing system is high. For systems that move plants with robots, many robots are required at large growspace scales to perform sensing tasks as each sensor reading requires moving plants through a growspace for a sensor reading and then transporting them back to their original location. In environments where sensor readings on plant growth are desired frequently, it is desirable to have a sensing configuration that avoids many distributed sensors, but is also time efficient.

Figure 10:
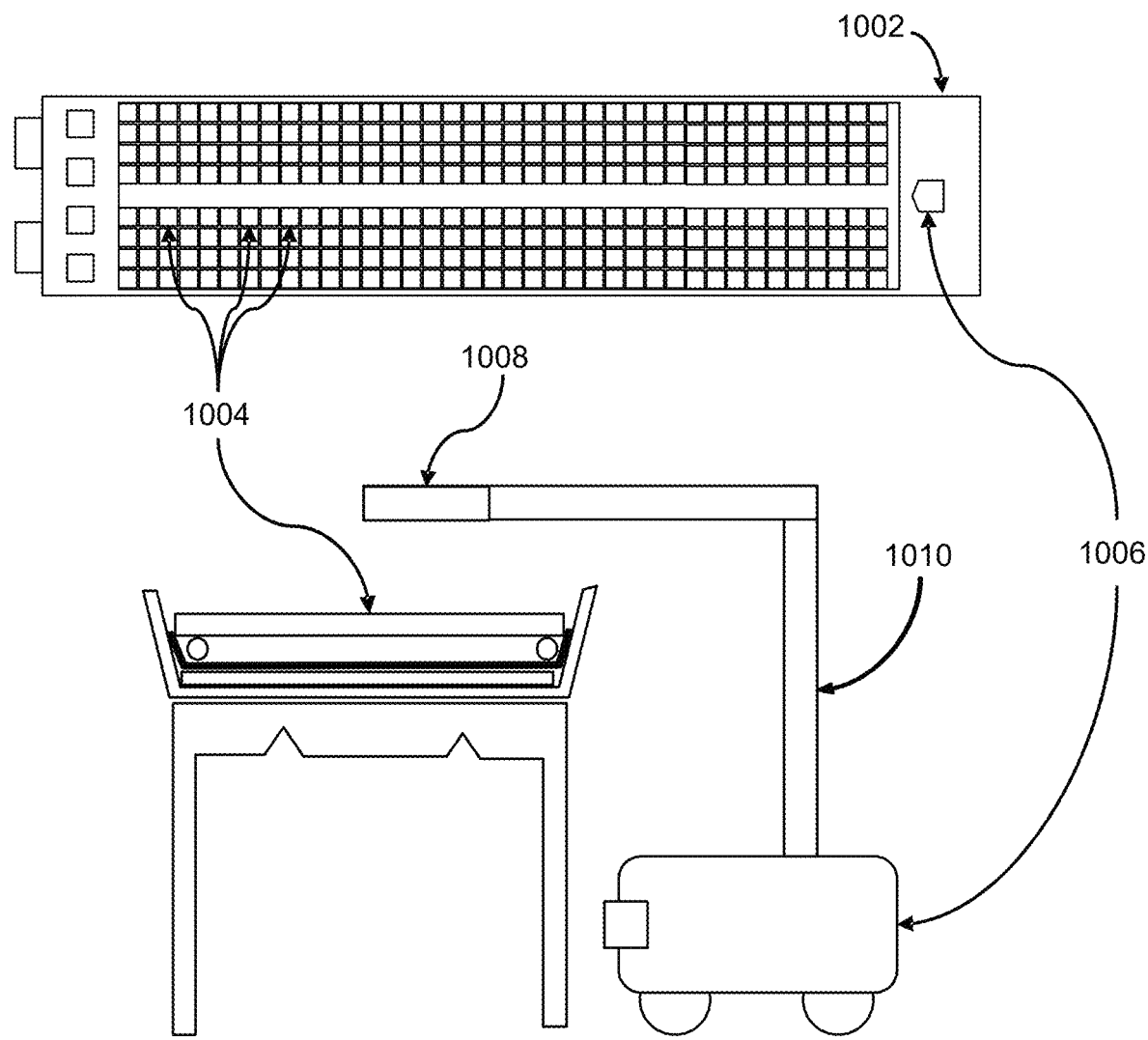
FIG. 10 illustrates an example of a control space with robot based sensing, in accordance with embodiments of the present disclosure.

FIG. 10 presents a system configuration in which a robot 1006 is outfitted with sensors 1008 attached to it via a sensor fixture 1010. Robot 1006 navigates through a growspace 1002 to place its sensors 1008 over growing trays 1004 located throughout the environment. Sensors 1008 then take readings of each growing tray 1004 and store them for processing. This configuration avoids the need for many distributed sensors to be placed in a growspace 1002, while putting them onto a robot instead which allows systems to save on both cost and system complexity. It also removes the need to transport growing trays 1004 directly in order to perform sensing by bringing sensor 1008 to growing trays 1004 via robot 1006 making sensing a time efficient process.

Many growspaces focus on ensuring sufficient variability and richness of environmental data on plants grown within a growspace in order to use the data to optimize production according to a desired criteria, like yield or taste. However, it may also be desirable to optimize for cost, energy, or labor of production where additional data is required to allow for optimal policy selection. Specifically, data on labor costs associated with production must be measured and combined with measured energy costs of growspace controls to determine the cost per unit weight, labor per unit weight, or energy per unit weight of plant produced.

Figure 11:
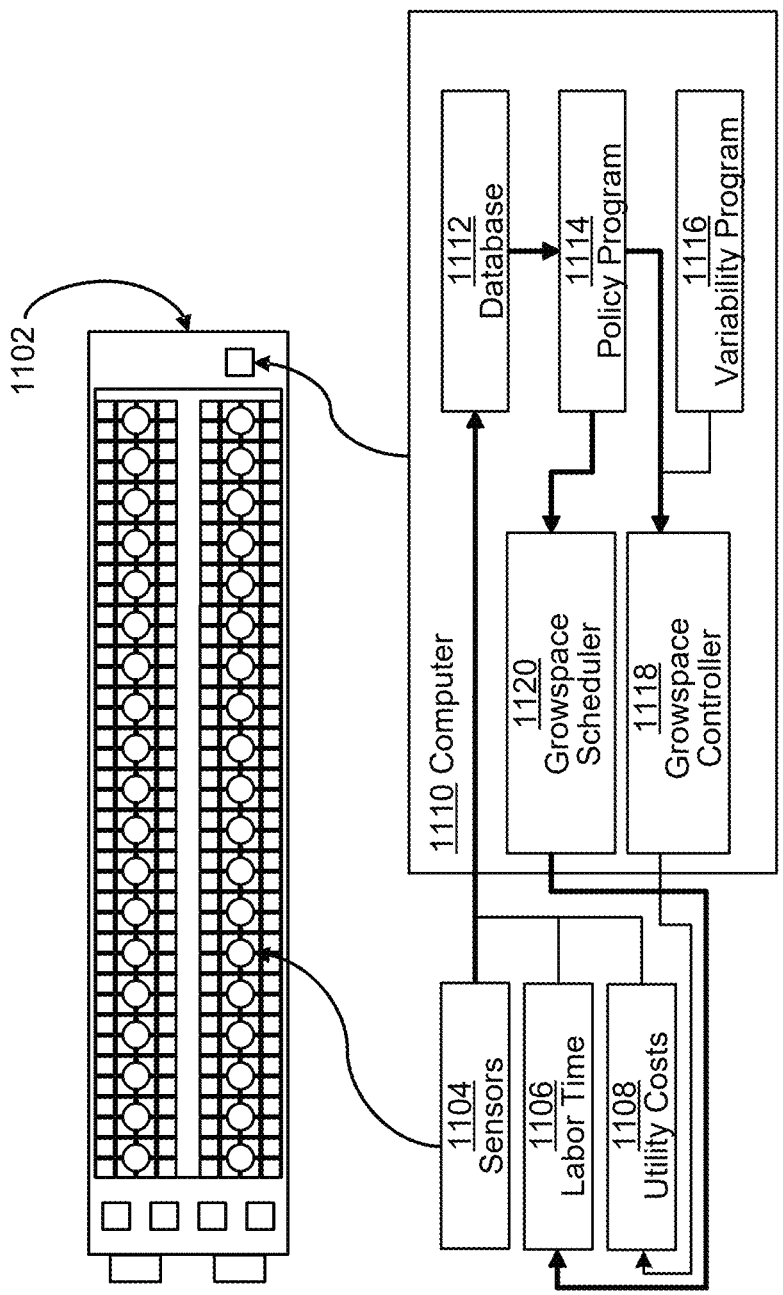
FIG. 11 illustrates an example of a control space with additional factor tracking, in accordance with embodiments of the present disclosure.

FIG. 11 shows an example system that tracks labor time 1106 and utility costs 1108 in addition to data from sensors 1104. These three data signals are fed into a database 1112, which gives policy program 1114, running on computer 1110, vital information about the likely cost of production for a given policy. In some embodiments, to gather data during operations, a growspace scheduler 1120 determines the labor required based on the current policy program 1114 and automatically times all labor operations (automated or human) that occur in growspace 1102 via computer 1110. In addition to this, the actions of growspace controller 1118 are monitored to determine utility costs 1108 of a given policy program 1114 with its associated variability program 1116. Adding labor time 1106 and utility costs 1108 to sensors 1104 deployed throughout growspace 1102 leads to a holistic view of plant production and new options for optimization (cost, energy, and labor) that are not possible in previous embodiments.

According to various embodiments, a policy program is used to optimize a growspace according to a desired optimization criteria. However, it may be desirable to gather data from and optimize multiple growspaces together to create richer and more robust models of operation. Additionally, it may be desirable to have a growspace in one location able to learn from data from growspaces in other locations.

Figure 12:
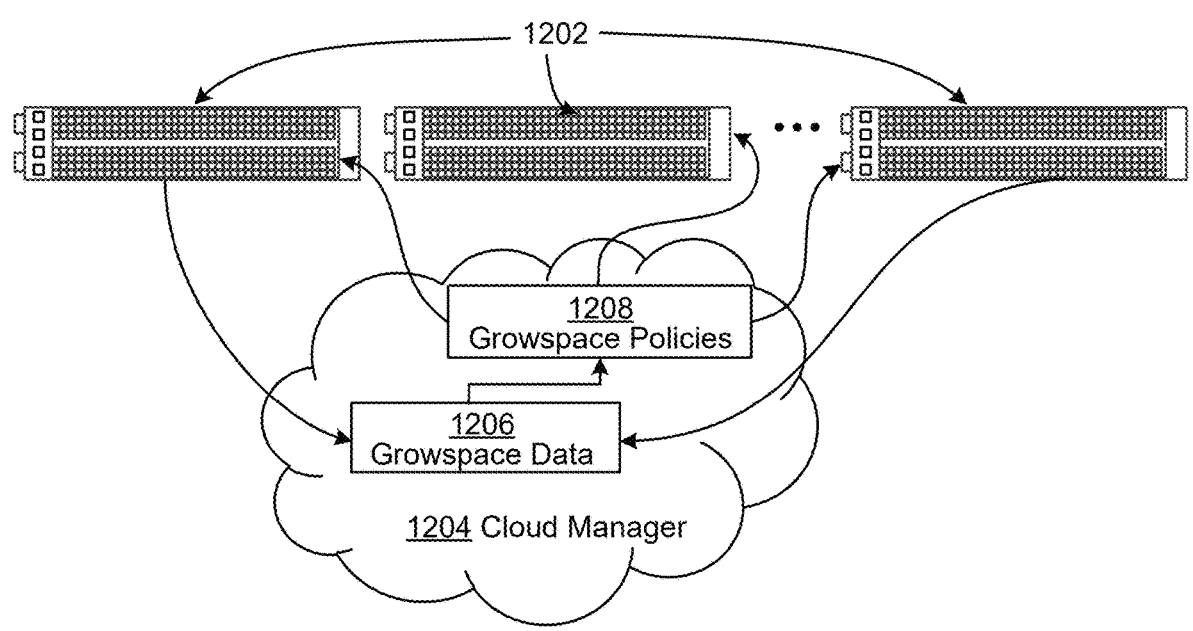
FIG. 12 illustrates an example of a multiple control space operating system, in accordance with embodiments of the present disclosure.

FIG. 12 presents a system configuration that sends growspace data 1206 from one or more growspaces 1202 to a cloud manager 1204 responsible for aggregating data across multiple growspaces 1202. Growspace data 1206 is then used to computer growspace policies 1208 that are passed back to each growspace 1202 for execution. This configuration allows the system to scale to any number of growspaces 1202 where each growspace 1202 also benefits from the data gathered by others in its growspace network.

Figure 13:
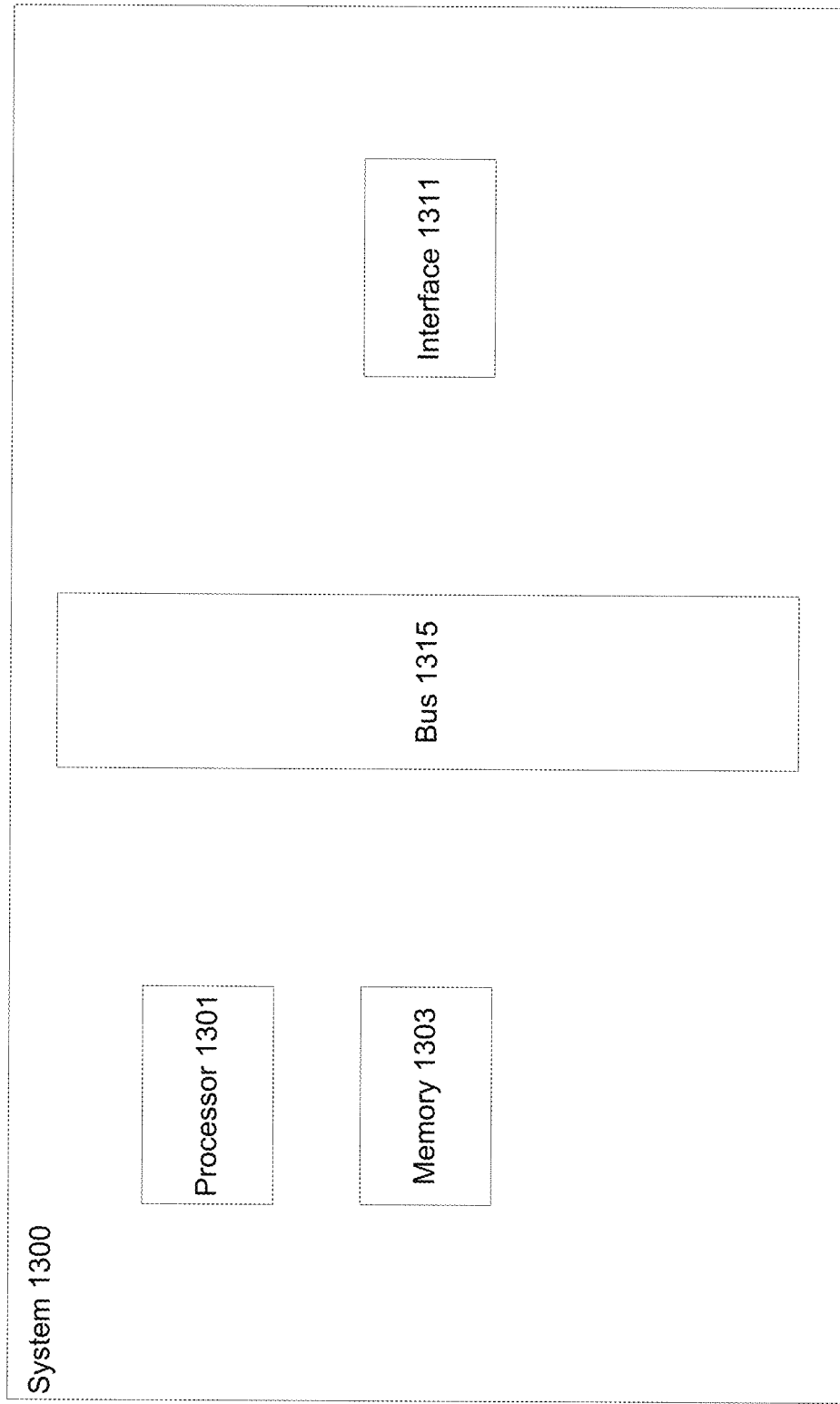
FIG. 13 illustrates an example of a computer system, configured in accordance with one or more embodiments.

The examples described above present various features that utilize a computer system or a robot that includes a computer. However, embodiments of the present disclosure can include all of, or various combinations of, each of the features described above. FIG. 13 illustrates one example of a computer system, in accordance with embodiments of the present disclosure. According to particular embodiments, a system 1300 suitable for implementing particular embodiments of the present disclosure includes a processor 1301, a memory 1303, an interface 1311, and a bus 1315 (e.g., a PCI bus or other interconnection fabric). When acting under the control of appropriate software or firmware, the processor 1301 is responsible for implementing applications such as an operating system kernel, a containerized storage driver, and one or more applications. Various specially configured devices can also be used in place of a processor 1301 or in addition to processor 1301. The interface 1311 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 1300 is a computer system configured to run a control space operating system, as shown herein. In some implementations, one or more of the computer components may be virtualized. For example, a physical server may be configured in a localized or cloud environment. The physical server may implement one or more virtual server environments in which the control space operating system is executed. Although a particular computer system is described, it should be recognized that a variety of alternative configurations are possible. For example, the modules may be implemented on another device connected to the computer system.

In the foregoing specification, the present disclosure has been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure.

What is claimed is:

1. A control space operating system, the system comprising:
 a control space comprising:
  one or more variable controllers configured for adjusting one or more variables in the control space;
  one or more sensors for gathering data; and
  one or more data source zones, each data source zone configured to house a data source that provides data to the one or more sensors; and
 a control space manager configured to:
  based on a desired degree of variability in data to be obtained from the one or more data source zones, adjusting values of one or more control space variables to introduce different degrees of variability across different data source zones, further comprising introducing greater variability for at least one data source zone compared to at least one other data source zone, including generating a plurality of datasets exhibiting a degree of variability that supports one or more machine learning models; and
  collect or store data gathered from the one or more sensors.

2. The system of claim 1, wherein the one or more variables includes nutrient mixtures.

3. The system of claim 1, wherein each data source zone allows full control over lighting conditions in the data source zone, independent of other data source zones.

4. The system of claim 1, wherein each data source zone includes zonal light emitting diodes (LEDs) or zonal shades for adjusting light in each data source zone.

5. The system of claim 1, wherein the one or more variables includes humidity.

6. The system of claim 1, further comprising utilizing a mobile robot to sense data.

7. The system of claim 1, wherein the control space includes a designated centralized sensing area to which data sources are transported for sensing data.

8. The system of claim 1, further comprising utilizing one or more data signals in determining an optimal policy for determining variable settings for data source zones, wherein the one or more data signals include labor time, utility cost, or sensor data.

9. The system of claim 1, wherein data gathered from the control space is transmitted to a cloud manager that aggregates data from multiple control spaces and facilitates generation of aggregated control space policies for use by the control space manager.

10. The system of claim 1, wherein each data source zone is configured for zonal carbon dioxide ($CO_2$) emission control.

\* \* \* \* \*